United States Patent [19]

Masson et al.

[11] Patent Number: 4,757,479
[45] Date of Patent: Jul. 12, 1988

[54] METHOD AND APPARATUS FOR CEMENT BOND LOGGING

[75] Inventors: Jean-Pierre H.R.M. Masson, Garches, France; Lee H. Gollwitzer; Robert A. Lester, both of Houston, Tex.

[73] Assignee: Schlumberger Technology Corporation, Houston, Tex.

[21] Appl. No.: 394,395

[22] Filed: Jul. 1, 1982

[51] Int. Cl.$^4$ .............................................. G01V 1/40
[52] U.S. Cl. ....................................... 367/35; 367/29; 181/105
[58] Field of Search ....................... 367/28, 29, 30, 35, 367/47; 181/105, 108

[56] References Cited

U.S. PATENT DOCUMENTS

| | | | |
|---|---|---|---|
| 3,149,304 | 9/1964 | Summers | 367/30 |
| 3,291,247 | 12/1966 | Majani et al. | 367/35 |
| 3,291,248 | 12/1966 | Majani et al. | 367/35 |
| 3,401,772 | 9/1968 | Synnott III | 367/35 |
| 3,401,773 | 9/1968 | Synnott III | 367/35 |
| 3,524,162 | 8/1970 | Zill | 367/30 |
| 3,696,884 | 10/1972 | Lafleur | 367/28 |
| 3,909,775 | 9/1975 | Larigue | 181/105 |
| 4,171,031 | 10/1979 | Marquis | 181/102 |
| 4,495,606 | 1/1985 | Smith | 367/86 |

OTHER PUBLICATIONS

Grosmangin et al., "A Sonic Method for Analyzing the Quality of Cementation...," 2/61, *Journal of Petroleum Tech.*, pp. 165–171.

Pardue et al., "Cement Bond Log—A Study of Cement and Casing Variables", 5/63, *Journal of Petroleum Tech.*, pp. 545–555.

Patent Memorandum, R. A. Lester, "Compensated CBL", 12/6/73.

McGee et al., "Guidelines for Improved Monitoring of Cement Operations", 21st Annual. SPWLA Logging Symp., 7/8–11/80.

Primary Examiner—Nelson Moskowitz
Assistant Examiner—Ian J. Lobo
Attorney, Agent, or Firm—Henry N. Garrana

[57] ABSTRACT

In accordance with principles of the present invention methods and apparatus are provided for evaluating the quality of the cement bond in cased boreholes. Acoustic energy is used to excite the borehole-casing-annulus-formation system and the quality of the cement bond is determined by examining the ratios of the signals received by two longitudinally spaced apart receivers supported on a sonde. The acoustic energy is generated by two transmitters symmetrically disposed above and below the receivers along the sonde. The spacings between the receivers themselves and between the receivers and the transmitters are selected so as to enhance the correlation between the ratios of the received signals and the quality of the cement bond log. An additional receiver, supported on the sonde at a small distance from one of the transmitters, is employed to determine the quality of the cement bond in hard formations.

5 Claims, 3 Drawing Sheets

METHOD AND APPARATUS FOR CEMENT BOND LOGGING

BACKGROUND OF THE INVENTION

1. Field of Invention

The present invention relates to cement bond logging and more particularly to methods and apparatus for measuring the attenuation rate of sonic energy traversing casing cemented in a borehole.

2. The Prior Art

In a well completion, a string of casing or pipe is set in a borehole and cement is forced into the annulus between the casing and the borehole primarily to separate oil and gas producing formations from each other and from water bearing strata. Obviously, if the cementing fails to provide a separation of one zone from another, then fluids under pressure from one zone may be able to migrate and contaminate an otherwise productive nearby zone. Migration of water, in particular, produces undesirable water cutting of a producing zone and possibly can make a well non-commercial.

It is a problem to obtain an accurate picture of conditions behind a casing because of the difficulty of propagating signals through the casing wall. Various prior proposals to determine the separation effectiveness, (i.e., the blocking or sealing characteristics) of the cement behind the casing have not been entirely successful in clearly determining the effective presence of cement in the annulus between the casing and the formation. Further, it has not been possible to measure reliably the quality of the cement bond between the casing and the cement.

The mere presence or absence of cement in the annulus between the casing and formation is valuable information, however, this does not provide a complete picture of the cement conditions. While cement may be present in the annulus, channels or inadequate sealing may still permit fluid communication between adjacent formations.

Use of the term "bond" in connection with the relationship of cement to the casing or the formation is somewhat vague, sinnce adherence along the entire boundary between the casing and the cement or between the cement and formation is not necessary to prevent fluid communication between adjacent porous zones. All that is necessary of a bond is that the relationship prevents the migration of fluids. Hereafter, reference to bond will mean that separation of zones by cement is adequate to prevent fluid migration between the zones.

Several prior developments for obtaining a measure of the quality of a cement bond relative to the casing have been disclosed in U.S. Pat. Nos. 3,291,274, 3,291,248 and 3,292,246. These systems generally utilize acoustic principles where an acoustic signal is transmitted between a transmitter and a receiver. The amplitude of the early arrival signal (this early arrival usually is the casing signal since the acoustic energy under average conditions generally travels faster in the casing than in the surrounding cement or formation) at the receiver is measured as a determination of the quality of the bond of cement to the casing. If a good bond existed, the casing signal would be expected to be attenuated because of the energy dissipated from the casing to the cement and surrounding formations, whereas if no bond or a poor bond existed the casing signal would be relatively unattenuated.

A more refined technque for determining the quality of cement in the annulus between the casing and the formations is disclosed in U.S. Pat. No. 3,401,773 entitled, "Method and Apparatus for Cement Logging of Cased Boreholes" by Judson D. Synnott, III and assigned to the assignee of the present invention. In this technique the amplitude of a reverberated early (casing) signal arrival is recorded and additionally, the total energy of a selected later portion of the sonic signal is obtained by integration to provide a second indication of the quality of the cement bond. Even in the absence of a weak casing arrival, the additional step of observing the total energy obtained by integrating a later portion of the signal in this manner can confirm the presence of cement in the casing-annulus-formation system. Details of related mathods may also be had by reference to U.S. Pat. No. 3,401,772 entitled, "Methods for Logging Cased Boreholes" by Frank P. Kokesh, which is assigned to the assignee of the present invention.

While the foregoing methods and apparatus provide very useful information, it is desirable to more precisely determine the quality of the cement bond. It has been established that the energy content of the acoustic logging signals arriving at the receiver depends on other factors than the quality of the cement bond to the casing or the integrity of the cement column (sometimes called cement quality). The following factors were found to have substantial effect on signal arrivals: receiver sensitivity; the formation hardness; eccentering of the acoustic logging tool; the high temperature environment and the temperature variations in the well bore; type of casing; and the diamater of the borehole and casing as well as their shape or geometry.

It will be appreciated, therefore, that it is highly desirable to provide methods and apparatus for determining the quality of the cement bond in a cased borehole, which methods and apparatus reduce the detrimental effects of the aforementioned factors.

SUMMARY OF THE INVENTION

In accordance with the principles of the present invention, the reception of an acoustic signal, generated at a location along the cased borehole is effected at a pair of spaced apart locations by acoustic receivers, spaced at respective fixed distances from the point of signal generation. The receivers intercept the acoustic signal energy transmitted along the casing and produce corresponding electrical signals each consisting of a plurality of alterations. The signals are passed through gates operative to select signal portions which follow the portion of the signals representative of direct compressional wave transmission along the casing. The selected signal portions from each receiver are then further processed and a product representative of a ratio of the respective processed signal portions is provided. This ratio product, in accordance with the invention, provides for a measurement indicative of the presence or absence of cement behind the casing in the region between the receivers, independently of factors such as the diameter, shape and geometry of the casing and borehole.

Further, in accordance with principles of the invention, in order that the signal arrivals be reliable representations of the acoustic energy travel through the media forming the casing-cement-formation system means are provided to effect the exclusion of the adverse representations of the acoustic energy travel between the sonde and the casing. Thus, in a borehole where a sonde as suggested by the prior art and having a single transmitter and receiver is used, it is necessary to correct the measured acoustic signal by some incremental value representing the effect of travel of acoustic energy between the sonde and the adjacent media. However, this incremental value is itself sometimes subject to error due to irregular spacing of the instrument from the media, resulting from the tilt of the sonde relative to the axis of the well bore. The logging system in accordance with the present invention, includes a sonde comprising two transmitters spaced respectively above and below the receivers. The transmitters are operated to obtain independent signals representing acoustic energy travel through the casing-cement-formation system. Thus two measurements are provided for each receiver, which measurements when combined, in accordance with the present invention, provide an output substantially free of the effects of the adverse representations of acoustic energy travel between the sonde and the casing. Advantageously, the result obtained from combining the signal outputs of the receivers, in accordance with the present invention, is also independent of receiver sensitivity. This independence represents a major advance over the prior art systems since it eliminates the need for constant correction or calibration of the receiver outputs for changes in receiver sensitivity which changes are due mostly to temperature effects.

While the prior art does include example of sonic logging systems comprising a sonde having a pair of spaced apart receivers included between an upper and a lower receiver, it will be appreciated that these systems were configured for operation in open (i.e., uncased) well bores for detecting formation parameters. These tools have little relevance to the field of cement bond logging due to the very nature of the signal being there measured, i.e., acoustic travel time. The distances between the receivers and transmitters on a sonde are selected to maximize the travel time of acoustic waves through the formation media under investigation relative to the travel time of the acoustic waves between the sonde and the formations. This leads to the selection of relatively large spacings between the receivers and the transmitters. In contrast, for cement bond logging purposes, in accordance with principles of the present invention, the spacings between the transmitters and receivers are selected to enhance not the travel time through the formations but the correlation between the combined output of the receivers and the quality of the cement bond. It will be appreciated that to provide receiver transmitter spacings of the order of those provided in tools configured for open hole logging purposes while appearing to be quite acceptable is actually detrimental to the operation of the system in cased holes since by the very nature of the measurement, the noise content of the signal in cased holes will increase proportionately with the distance between the receiver and the transmitter. Therefore, the choice of transmitter to receiver spacings is crucial to the realization of the advantages of the present invention.

Yet in further accordance with principles of the present invention, a system is provided for effecting cement bond logging in "hard" formations. Hard formations are characterized by an acoustic travel time which approaches that of the casing or in some cases is less. Therefore, with the conventional transmitter to receiver spacings provided, the acoustic signal transmitted through the casing arrives at a receiver substantially with or before the acoustic signal transmitted through the hard formation and therefore leads to erroneous conclusions relative to the quality of the cement bond. It is therefore proposed, in accordance with principles of the present invention, a transmitter to receiver spacing which would allow for sufficient separation between the casing arrivals and the formation arrivals when logging in hard formations. This is accomplished by selecting a transmitter to receiver spacing where the acoustic travel time, of a generated wave, through the casing and cement to the formation is a significant portion of the travel time of the acoustic wave through the formation. In this manner the delay afforded by the passage of the waves through the casing and cement to the formation and the return passage to the borehole is sufficient to allow at the receiver the separation of the casing arrivals from the formation arrivals and therefore allow for a determination of the quality of the cement bond between the casing and the hard formation.

In accordance with the objects of the present invention, methods and apparatus for logging cased boreholes to obtain an evaluation recording of cement conditions are provided. This is made possible by the use of novel logging apparatus and methods including the use of a plurality of spaced apart receivers supported on a sonde between an upper and a lower transmitter. The signals received by two of the receivers are combined in a novel way to reduce adverse effects due to borehole conditions and receiver sensitivity. The transmitter to receiver spacings are selected to enhance the correlation between the quality of the cement bond and the combination of the receiver outputs. A third receiver is supported on the sonde for effecting a measurement of the cement bond in hard formations.

It is a further object of the present invention to modify the amplitude of energy detected at each receiver to compensate for fluctuations in transmitter output.

The novel features of the present invention are set forth with particularity in the appended claims. The operation together with further objects and advantages of the invention may be best understood by way of illustration and examples of certain embodiments when taken in conjunction with the accompanying drawings.

DESCRIPTION OF THE PREFERRED EMBODIMENT

Figure 1:
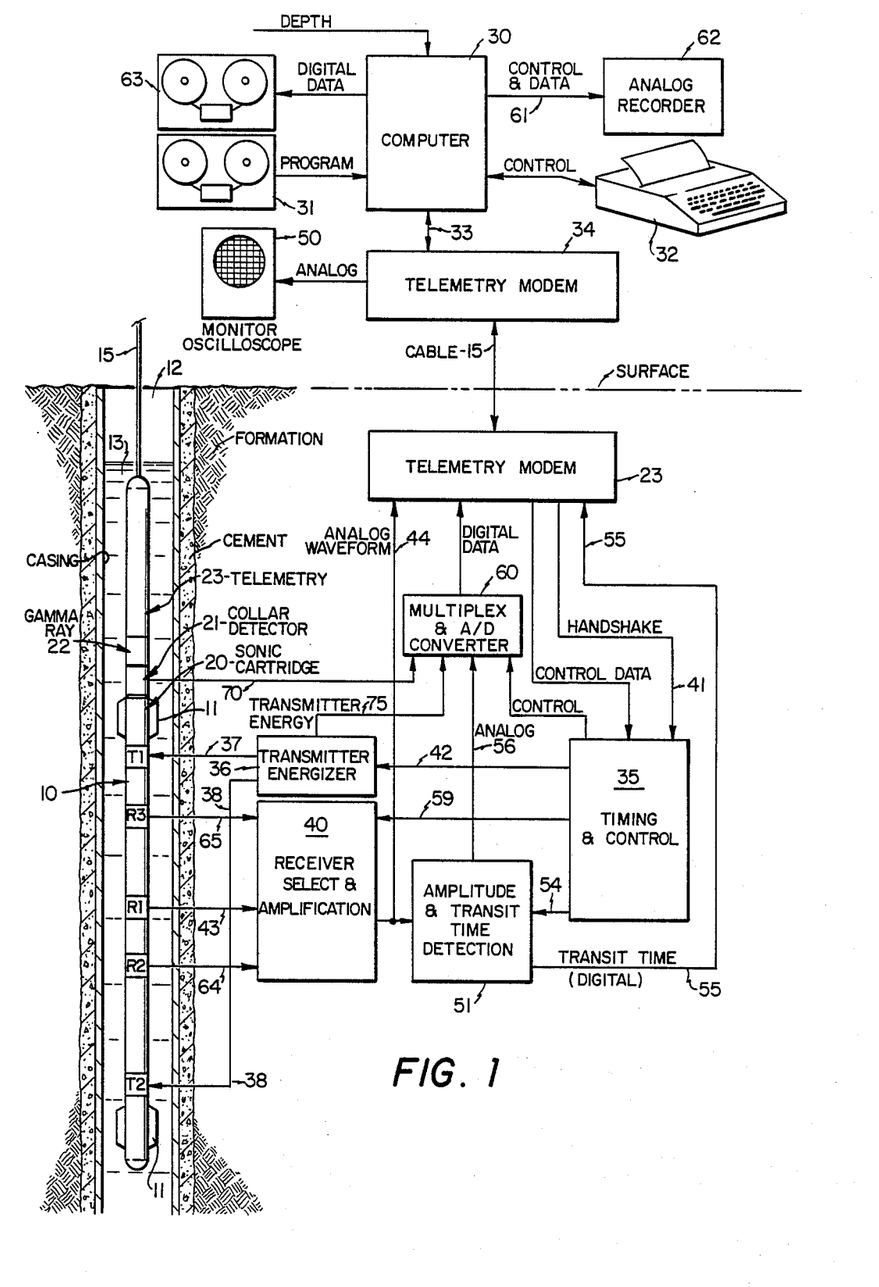
FIG. 1 illustrates an embodiment of a logging system using the principles of the present invention in block form.

In FIG. 1 there is illustrated a logging system for carrying out the invention and including an elongated logging tool 10 provided with centralizers 11 for maintaining the tool centered as effectively as possible in a borehole 12. The borehole 12 is shown filled with fluid 13. The tool 10 is suspended in the well bore by means of cable 15 extending from the upper end of the tool to the surface of the earth. The cable 15, typically a monocable, is spooled on a winch, not shown, but as well known in the art the operation serves to raise and lower the tool 10 through the well bore 12. Indications of the depth at which the tool is suspended in the bore hole can be provided by means (not shown) for measuring the length of the cable. This information is utilized to provide one of the functions in the typical well log.

The tool 10 itself is divided into several sections. The lower section between the centralizers 11 includes a plurality of acoustic transducers including transmitters T1 and T2 as well as three acoustic receivers R1, R2 and R3. Above the acoustic transducers is a sonic cartridge containing the required electronics for processing data from the acoustic transducers as well as data from a collar detector 21 and a natural gamma ray detector 22. The upper part of the logging tool includes a telemetry modem 23 utilized to transmit information uphole as well as to act as a receiver of control information for the downhole equipment.

Operation of the logging system is under control of a properly programmed digital computer 30 located at the surface. The program or instructions for the computer are initially stored on tape transport 31 and upon command from terminal 32, are loaded into the computer 30. The terminal 32 includes a printer which provides a monitor for instructions from the terminal to the computer and also enables an operator to interrogate the computer. When the system is ready for operation the computer 30 will send a command to the downhole equipment via bus 33, telemetry modem 34 and cable 15. The telemetry modem 23, in the downhole tool 10, applies the control data or command to a timing and control 35 which establishes conditions for the specific task to be performed in the sequence of operations. For example, the timing and control 35 under the computer instructions will establish whether transmitter T1 will be fired by way of transmitter energizer 36 and conductor 37 or whether transmitter T2 is to be fired via the transmitter energizer 36 and conductor 38. The timing and control 35 also establish which of the receiver outputs will be selected and amplified by way of receiver select and amplification means 40. Having now established the downhole task to be performed a handshake or sync signal is transmitted from the computer by way of telemetry modem 23 and conductor 41 to the timing control 35 to begin a cycle of the sequence of operations which includes measuring the peak or amplitude of the first halfcycle of the casing signal appearing at the receivers.

While the information concerning the amplitude of the received signals travelling by way of casing can be utilized in the generation of conventional cement bond logs, the amplitude information is processed by the computer in accordance with the present invention to generate an attenuation rate log which more accurately represents the condition or degree of bonding of cement to the casing. In a conventional cement bond log where the amplitude of the received signal is plotted as a function of depth there are a number of conditions or factors that affect the signal and tend to introduce errors in the resultant log. These conditions include receiver sensitivity, transmitter output, borehole temperature variations, drilling fluid condition, formation hardness or velocity and eccentering of the logging tool.

Figures 2, 3, 4:
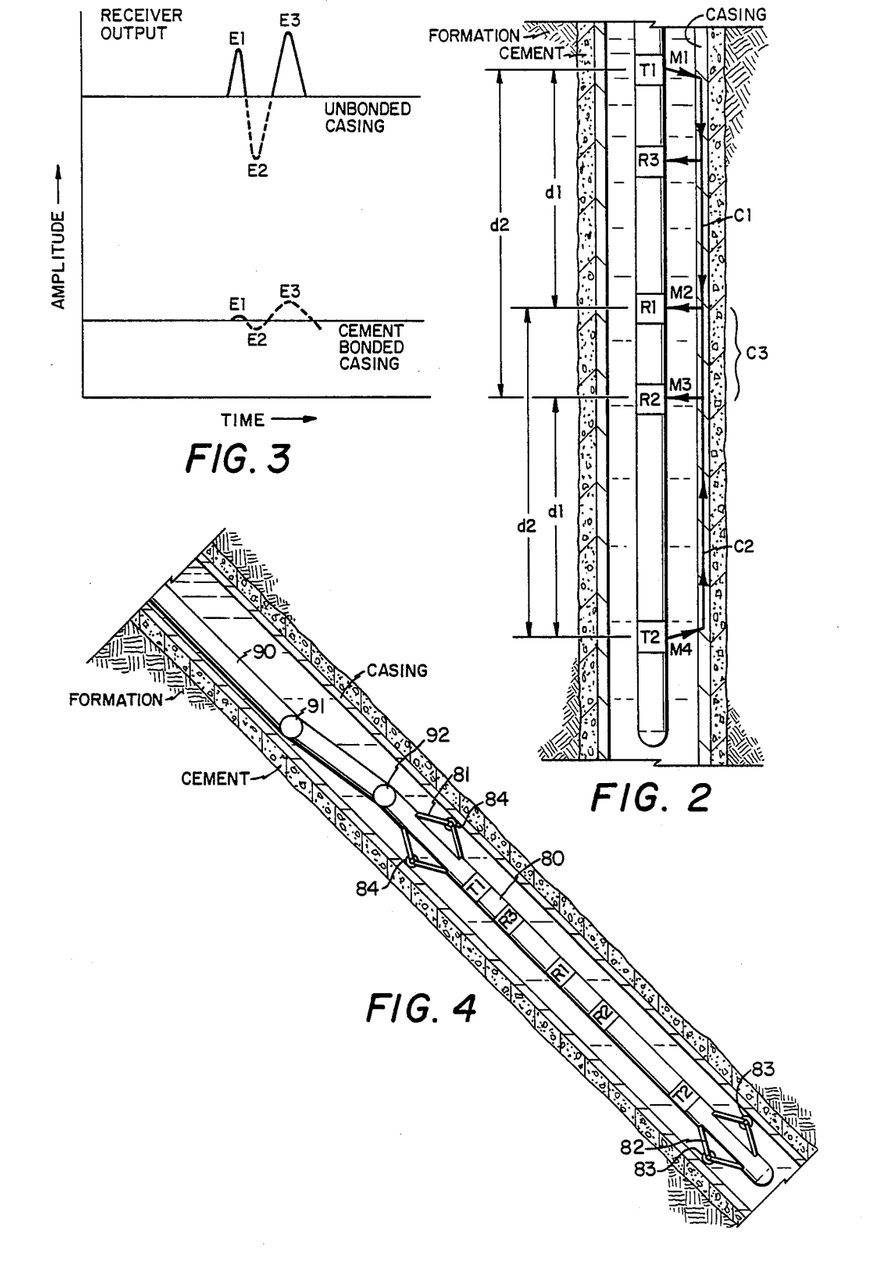
FIG. 2 is an enlarged view of a portion of FIG. 1 indicating acoustic wave paths through the drilling fluid and the casing.
FIG. 3 illustrates the form of acoustic signal travelling through a cemented casing under different cement bond conditions.
FIG. 4 illustrates modification of a downhole sonde providing for minimum eccentering under substantial well deviation conditions.

The effects of these various parameters or conditions can be largely reduced or eliminated by the transmitter and receiver arrangement and physical relationship shown in FIGS. 1 and 2 operating in conjunction with the method and apparatus of the present invention. For convenience the attenuation due to the drilling fluid may be lumped into a single attenuation factor M which may be assumed to be effective over a lateral portion of the acoustic energy wave path between the casing and the respective transmitters and receivers. In FIG. 2 the lump attenuation factor between the transmitters T1 and T2 and the casing have been designated as M1 and M4 whereas the attenuation factor between the receivers R1 and R2 and the casing have been designated as M2 and M3. The factors M1, M2, M3 and M4 can be eliminated by taking a ratio of the acoustic signal amplitudes received at each receiver from one of the transmitters and multiplying this ratio by a similar ratio obtained from a comparison of acoustic signal amplitudes at these receivers from the other transmitter. The various sonic signal amplitudes corresponding to each transmitter-receiver pair are designated T1 R1, T1 R2, T2 R1, T2 R2. The attenuation through the longitudinal zone between the transmitter T1 and the receiver R1 is designated C1 and the transmission over the longitudinal zone between the transmitter T2 and the receiver R2 is designated C2. C3 is the desired attenuation function between the longitudinal zone defined between the receivers R1 and R2. It can be shown by relative simple mathematical manipulation that the undesired transfer or attenuation functions M1, M2, M3 and M4 can be eliminated together with the attenuation functions C1 C2 leaving only the desired attenuation function C3 by taking the product ratio of the amplitudes of signals from the various receivers.

When investigating the media forming a cased well bore, it is important that the logging tool be substantially centered in the borehole. The reason for this concerns the length of the path which acoustic energy must travel between the acoustic transmitter and receiver and the maximum amplitude of the first arrival of the casing signal. The time for acoustic energy to travel through casing to the receiver is known thus enabling a gate to be opened at the appropriate time to measure the peak amplitude of the first energy (the casing signal) arrival at the receiver. The time and amplitude is determined for the case of a centered logging tool. If the logging tool is eccentric in the borehole, the energy emitted from one side of the tool will have a shorter path to and from the casing thus causing the casing arrival at the receiver to be sooner than expected. Thus the above-mentioned gate will not be time centered and the measured casing arrival amplitude will be lower, causing errors in the cement bond log.

However, with the configuration of and operation of transducers shown in FIG. 2 the problem introduced by eccentering is minimized in as much as the same portion of the casing signal from all receivers will be measured.

The determination of attenuation rate in accordance with the present invention, is explained by reference to FIG. 2 where the two transmitters T1 and T2 are located symmetrically with respect to the two receivers R1 and R2. At a distance d1 from the upper transmitter T1 the amplitude of the casing-borne sonic wave initiated by transmitter T1 will be attenuated and can be expressed as:

$$A_{11} = P_1 S_1 \, 10^{-\frac{a}{20} d1} \quad (1)$$

where $A_{11}$ is the output of the receiver $R_1$ in millivolts, $P_1$ is the pressure amplitude for d1=0, $S_1$ is the receiver sensitivity in millivolts per bar and a is the attenuation rate of the sonic signal in decibels per foot. This relationship was established by Pardue, et. al., in an article entitled "Cement Bond Log—A Study of Cement and Casing Variables," appearing in the *Journal of Petroleum Technology*, May, 1963, at page 545. The output of receiver R2 can be written as:

$$A_{12} = P_1 S_2 \, 10^{-\frac{a}{20} d2} \quad (2)$$

Similarly, when firing the lower transmitter T2, the output of the receivers $R_1$ and $R_2$ can be written as:

$$A_{21} = P_2 S_1 \, 10^{-\frac{a}{20} d2} \quad (3)$$

$$A_{22} = P_2 S_2 \, 10^{-\frac{a}{20} d1} \quad (4)$$

Utilizing equations (1) to (4) the following ratio is formed:

$$\left[ \frac{A_{12} A_{21}}{A_{11} A_{22}} \right] = 10^{\frac{-2a}{20}(d2-d1)} \quad (5)$$

The foregoing relationship shown in equation (5) is called to BHC ratio. From the BHC-ratio (5) the attenuation rate a can be obtained by performing:

$$\frac{-10}{d2 - d1} \log_{10} \left[ \frac{A_{12} A_{21}}{A_{11} A_{22}} \right] = a \quad (6)$$

where a is expressed in decibels per foot. It is to be observed that the measured attenuation is independent of receiver sensitivity, transmitter output power and fluid attenuation for any given sequence of operation.

The BHC attenuation measurement as established by the present invention has a number of advantages over the standard cement bond log measurement and can be summarized as follows. As seen from FIG. 2 the sonic signals reaching R1 or R2 have travelled the same path through the casing fluid and its effect is thus eliminated while performing the ratio of amplitudes. The fluid attenuation effect can be important in heavy or gas cut muds. The transducer output will ordinarily decrease with increase in temperature and the receiver sensitivity may also decrease with age. These effects are effectively cancelled by utilizing the ratio technique. As mentioned earlier the BHC attenuation or ratio technique is independent of the absolute value of signal level. The measuring range of up to twenty db per foot is only limited by the value of the signal-to-noise ratio. In addition eccentering of up to 0.3 inches can be tolerated without having a significant effect upon the accuracy of the measurement.

We have found that the spacing, the physical distance between the transmitters and the receivers is critical in order to obtain an accurate and reliable cement bond log. If the spacing is too long the signal noise ratio suffers to the point where the casing signal is buried in noise and cannot be detected. Even if the spacing is adjusted to enable the detection of the casing signal there are situations where the detected signal does not represent the casing signal. This occurs in situations where the velocity of the surrounding formations is higher than the velocity of sound through casing and where the transmitter to receiver spacing is large the formation signal will appear at the receiver prior to the arrival of the casing signal giving rise to an erroneous measurement.

On the other hand if the receiver to transmitter spacings are too close the errors introduced by eccentering introduce errors. Accordingly the spacing between the transmitters and the receivers should be such as to provide for a measurable signal-noise-ratio, the arrival of the cement bond signal prior to the arrival of a formation signal and to tolerate eccentering of as much as 0.3 inches. The foregoing is accomplished by establishing a distance of approximately 2.4 feet from the transmitter T1 to the receiver R1 and similarly a distance of 2.4 feet from the transmitter T2 to the receiver R2. The receiver R2 should be approximately 3.4 feet from the transmitter T1 and the receiver R1 should be approximately 3.4 feet from the transmitter T2. The receiver R3 utilized principally in production to a variable density log, is in one embodiment, spaced 5 feet from the transmitter T2.

Referring to FIG. 1 there will now be described the system for acquiring the casing signal data for use in the relationship defined by expression (6). Upon instructions from computer 30 to timing and control 35 a handshake or sync signal follows. The timing and control 35 now sends a firing command to the transmitter energizer 36 by way of conductor 42 for the generation by transmitter T1 of acoustic energy which travels outwardly through the drilling fluid and is refracted along the casing and back through the drilling fluid to receiver R1. The output of receiver R1 is applied by way of conductor 43 to the receiver select and amplification means 40 whose output, an analog signal, is transmitted uphole by way of conductor 44 telemetry modem 23 cable 15 telemetry modem 34 to the monitor oscilloscope 50. The analog output from the receiver select and amplification means 40 is also applied to the amplitude and transit time detection means 51 where the peak amplitude of the casing signal is detected and the transit time of the signal determined.

A typical waveform for casing signals arriving at receivers under different cement bond conditions is illustrated in FIG. 3. It will be observed that where the casing is unbonded the halfcycles of the waveform comprising peaks E1, E2 and E3 are significantly greater than the amplitude of the corresponding peaks under conditions where the casing is well bonded to the cement. The halfcycle whose peak is to be detected is optional with the operator who, having knowledge of the transit time of acoustic energy through casing as well as the distance between the transmitter and the selected receiver, can establish by way of the computer an effective gate onset which is implemented by way of the timing and control 35 which conditions the amplitude and transit time detection means 51 to measure the peak amplitude of a selected halfcycle of the casing signal. Typically, the amplitude of peak E1 is detected.

Transit time detection or measurement is effected also by way of a control pulse from the timing and control means 35 applied by way of conductor 54 to the amplitude and transit time detection means 51 which control pulse signifies the time at which the transmitter T1 has been fired. Utilizing conventional timing circuits in the means 51 a digital signal is produced representative of the value of the transit time for acoustic energy to travel from the transmitter T1 to the receiver R1. This digital signal is applied directly by way of conductor 55 to the telemetry modem 23 for transmission to the surface.

The analog signal representative of the peak amplitude of the detected casing signal is applied by way of conductor 56 to the multiplex and A/D converter 60 whose digital output is also applied to telemetry modem 23 for transmission to the surface.

The transit time signal is processed by the computer 30 converted to an analog signal and is available, at the option of the operator, to be recorded by the analog recorder 61 as a function of depth; the depth function as previously described being generated by conventional means also being processed by the computer and utilized to displace the data with respect to the recording medium. The digital representation of the detected amplitude of the casing signal is momentarily stored by the computer 30 to be utilized in conjunction with other data to generate a signal representative of attenuation rate in accordance with the present invention.

The system having performed the first cycle in the sequence the computer 30 now sends additional instructions to the timing and control means in the manner above described once again to fire transmitter T1 and effectively now to connect the output of receiver R2 to the receiver select and amplification means 30. Again there is detected the amplitude of a casing signal arriving at receiver R2 and the transit time of that signal between the transmitter T1 and the receiver R2. The transit time may be recorded at the analog recorder 62 as a function of depth and again the digital value of the amplitude of the received casing signal is stored in the computer 30.

In the next cycle of the sequence, instructions are transmitted from the computer 30 to the timing and control means 35 to establish conditions for the firing of the transmitter T2 and for the connection of the receiver R2. Upon the handshake by way of conductor 41, the transmitter T2 fires and acoustic energy travelling by way of the casing is detected at the receiver R2 where the peak amplitude E1 of the first halfcycle is detected by the amplitude detector 51 and applied by way of conductor 56 where it is converted to a digital signal in the multiplex and A/D converter 60 and transmitted uphole for storage in the computer 30. The transit time of the energy between the transmitter T2 and the receiver R2 is also measured or detected in the manner aforesaid and transmitted uphole.

Upon further instructions from the computer 30 and following the handshake signal the transmitter T2 again fires and the energy received at the receiver R2 by way of the casing is applied by way of conductor 43 to the receiver select and amplification 40 where again the analog representation of the signal is transmitted over conductor 44 by way of telemetry modem 23 to the uphole monitor oscilloscope 50. In the manner above described the amplitude of the first halfcycle of the energy arriving by way of the casing is detected and applied to the multiplex and A/D converter for transmission to the computer 30 and the transit time is detected and the digital representation from the amplitude and transit time detection means 51 is applied to the telemetry modem 23 by way of conductor 55 for transmission uphole to the computer 30 for recording, if desired, on the analog recorder 62.

Now in the final stage of the sequence as it relates to the generation of acoustic energy and detection after travel by way of the casing the transmitter T2 is again fired and the output of receiver R3 is applied by way of conductor 65 and receiver select and amplification means 40 to the telemetry modem 23 by way of conductor 44. The signal or wave train from the receiver R3 is utilized for the production of a variable density log in a manner well known in the art.

Thus where the recorder 62 is comprised of an oscilloscope and photographic film, such a log is produced by sweeping an electron beam across the face of the oscilloscope and modulating the beam intensity with the received acoustic energy waveform while moving the film, as a function of depth of the logging tool, past the face of the oscilloscope. A typical variable density log is illustrated in FIG. 4 of U.S. Pat. No. 3,696,884.

This now completes the sequence of operations which are comprised in the acoustical detection of five cycles, namely T1 to R1, T1 to R2, T2 to R2, T2 to R1, and T2 to R3. Each cycle requires control information to be transmitted from the computer 30 to the downhole equipment followed by a handshake. The handshake is the sync signal that informs the downhole equipment to execute the instructions. Following the acquisition of casing signal amplitude for each seqsuence, computer 30 produces an attenuation rate signal a in accordance with the relationship defined by expression (6) and this signal is recorded as a function of depth of the logging tool by recorder 62.

The downhole tool also includes the collar detector 21 and the natural gamma ray detector 22. The outputs of these detectors are shown being applied by way of conductor 70 to the multiplex and A/D converter 60 which is under control of the timing and control means 35. The digital representations of these signals which fire the five cycles of the acoustic mode of operation are applied uphole by way of the telemetry modem 23 cable 15 to the computer where they are processed and recorded as a function of depth by the analog recorder 62. The parameters of natural gamma ray and collar detector are useful in correlating the resulting cement bond log with other logs previously taken in open hole.

In the system of FIG. 1, the transmitters T1 and T2 are fired four times in each sequence of casing signal amplitude measurement. It is possible that between successive firing of the transmitter T1 or successive firing of the transmitter T2 the output of either transmitter may change. In that event an error would be introduced to the ratio determination. Such error, due to sudden variation in transmitter output can be avoided by way of a method in which signals from receivers R1 and R2 are produced for each firing of transmitter T1. Likewise signals from receivers R2 and R1 would be produced for each firing of the transmitter T2. The system of FIG. 1 would be modified to include a second amplitude and transit time detection means like that means 51. In such event the receiver select 40 would connect receiver R1 to one of the detection means and connect receiver R2 to the other of the detection means. Therefore, each transmitter firing results in the production of two receiver signals utilized in a ratio relationship and accordingly the operation avoids the introduction of error due to any types of changes in transmitter output.

It will be recalled that the system of FIG. 1 provides for the determination of acoustic transit time between transmitters and receivers and the recording of same. This information is useful where hard formations may be encountered. In formations where the travel time is less than 57 microseconds per foot the 3.4 foot amplitude measurement is no longer valid. Indeed neither is a measurement taken with a transmitter to receiver spacing of 3 feet. Under such conditions the formation signal travelling behind the cement sheath precedes and superimposes itself on the casing-borne signal. It is now impossible to measure the attenuation rate due to the casing-cement bond with the transducer spacings described.

Shorter transducer spacing would seem dictated when measuring attenuation rate in the environment of a hard or fast formation. However, shorter spacing introduces error due to eccentering. The shorter the T to R spacing the more pronounced is the eccentering effect.

Since under such fast formation conditions, attenuation rate measurement is impractical, rather than stop the gathering of data, advantage is taken of the physical position of the receiver R3 to continue to obtain some measure of cement bond conditions. The receiver R3 has been placed 5 feet from transmitter T2 for the purpose of obtaining a standard variable density log. This places receiver R3 approximately 0.8 feet from transmitter T1. We have determined that at this spacing, the first arriving signal will be the casing signal even where the formation traveltime is as low as 47 microseconds per foot.

The operator, in the course of the logging operation, will observe the value of transit time between a selected pair of transmitter and receiver. When the observed transit time falls below the transit time of acoustic energy in casing the computer 30 will be instructed via terminal 32 to change the sequence of downhole operations. The system operation will be modified to produce a conventional cement bond log where the peak of the first halfcycle of signal from receiver R3 in response to acoustic energy from transmitter T1 will be detected by the amplitude detection means 51 and recorded by recorder 62.

When the foregoing operations are being conducted to produce the conventional cement bond log transmitter output variation poses a problem. In accordance with another aspect of the present invention errors introduced by variations in transmitter output are circumvented. More particularly the output of the receivers is modified as a function of transmitter output.

The downhole system includes a transmitter energy detector which provides a measure of the energy being generated by the transmitters T1 and T2 each time they are fired. The measurement is of the voltage being applied to the transmitters by the transmitter energizer 36. For example, a typical voltage applied to each transmitter is approximately 1500 volts. Should the voltage output of the energizer vary and drop to as low as 750 volts between successive firings of the transmitter T1 the detected peak amplitude of the received signal will also drop resulting in an error.

A measure of transmitter voltage (TV) is produced in the transmitter energizer 36 and applied by way of conductor 75 to the multiplex and A/D converter 60. The digital value of the measured transmitter voltage is utilized by computer 30 in accordance with the following expression:

$$A'13 = \frac{A13}{G} \times \frac{1500}{TV} \tag{7}$$

where:

A'13 is the amplitude of the signal to be recorded or otherwise used,

A13 is the measured signal amplitude, and

G is the gain of the amplification means 40.

The above described modification of the receiver signal as a function of transmitter voltage gives rise to more accurate conventional type cement bond logs and may be utilized in systems other than than illustrated in FIG. 1. It is also valuable in the ratio method where the possibility exists of fluctuations in transmitter voltage between sucessive firing of a given transmitter. Accordingly the system of FIG. 1 is arranged to be operated in such manner as to sense the value of the transmitter voltage for each firing of the transmitters T1 and T2 and each received signal is modified by a factor comprised of the ratio of the predetermined transmitter voltage to the measured transmitter voltage.

In the discussion above reference was made to eccentering and problems introduced when eccentering became significantly high. The present system can produce an accurate attenuation rate log where the eccentering is as great as 0.3 inches. Maintaining this limit becomes a problem in deviated wells where the deviation is in excess of 20 degrees. In those instances the weight of the logging tool is increasingly applied against the centralizers causing the tool to move away from a centered position to a position closer to the casing. The eccentering problem is materially reduced by utilizing the logging tool of FIG. 4. This arrangement makes it possible to maintain the tool to within 0.3 inches of the casing axis where the well deviation is as great as 90 degrees. The lower portion 80 of the tool houses the transmitters T1 and T2 and the receivers R1, R2 and R3. The lower portion 80 is maintained centrally of the casing by means of in-line centralizers 81 and 82 each respectively having wheels 84 and 83 to ease the passage of the tool along the casing.

The lower portion 80 is, in and of itself, light enough to avoid significantly compressing the centralizers 81 and 82 even when the portion is in a horizontal position, i.e., a well deviation of 90 degrees. The light weight is maintained by effectively mechanically decoupling the lower portion 80 from the remainder of the logging tool. The decoupling is provided by two flex joints 91 and 92 located between cartridge 90 and the lower portion 80. The articulation provided by the flex joints renders the lower portion free from lateral excursions of the cartridge 90 and other upper portions of the logging tool due to forces including gravity.

The cement bond tool is a 2¾ inch size logging tool rated at 350° F. and 21,000 p.s.i. That portion of the tool housing the transducers is light, about 100 pounds, and made rigid. The optimum transmitter to receiver separation was set at 2.4 feet and 3.4 feet for the near and far receivers, respectively. A separate receiver was set at 5 feet from the lower transmitter to provide data for a variable density log. This same receiver spaced 0.8 feet from the upper transmitter provides data for a conventional cement bond log when logging through fast formations. The computer 30 used in one embodiment is a PDP 1134.

Figure 5:
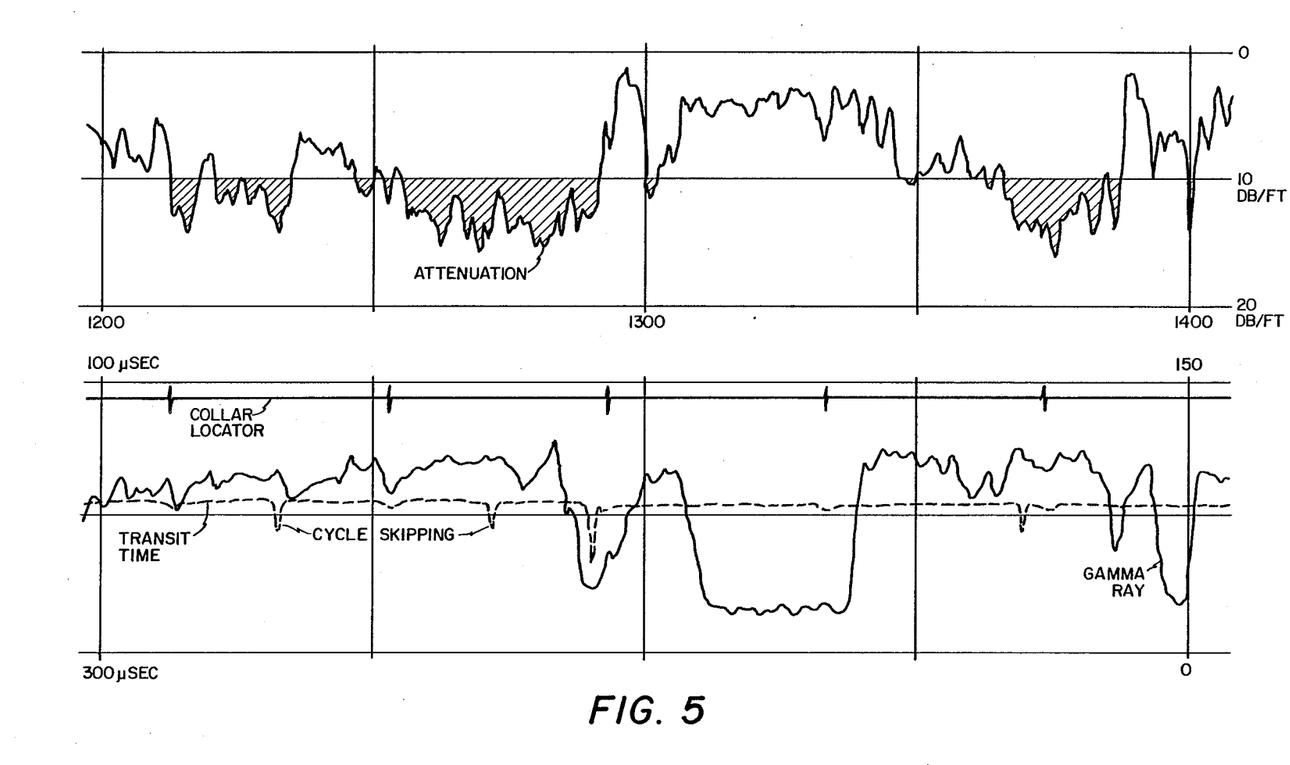
FIG. 5 illustrates a typical cement bond attenuation rate log produced in accordance with the present invention as well as other types of logs produced with the system of FIG. 1.

Referring now to FIG. 5 there are shown examples of the BHC attenuation log, produced in accordance with the present invention, as well as a natural gamma log, a collar locator log and a transit time log. The transit time log is fairly constant in value indicating that the detected signals are casing-borne. Not unexpected in the transit time log are abrupt changes which are due to malfunction and known in the art as cycle skipping. The attenuation rate log shows at a depth of 1296 feet a very low attenuation rate indicative of a poor cement bond. Any measure above 10 db/ft would indicate a good cement bond. Values less than 10 db/ft may be acceptable, and centainly low values of attenuation rate should raise a question concerning the competency of the cement bond.

While there have been described what are at present considered to be preferred embodiments of this invention, it will be obvious to those skilled in the art that various changes and modifications may be made without departing from the invention concepts involved and it is the intention of the appended claims to cover all such changes and modifications falling within the true spirit and scope of the present invention.

What is claimed is:

1. A method for obtaining a measure of quality of a cement bond relative to a casing in a borehole comprising the steps of:
    establishing a well tool having two longitudinally spaced acoustic transmitters and at least two longitudinally spaced acoustic receivers disposed between said acoustic transmitters with a transmitter receiver spacing to normally provide for a measurable signal-noise-ratio, the arrival of a casing signal prior to the arrival of a formation signal and to tolerate eccentring of as much as 0.3 inches;
    repetitively energizing said acoustic transmitters to apply acoustic energy into the casing surrounding said well tool;
    detecting at said receivers energy from a first of said transmitters arriving at said receivers by way of said casing;
    detecting at said receivers acoustic energy arriving by way of said casing from a second of said transmitters following the firing of said first transmitter;
    for each of the forgoing generations and detections measuring the peak amplitude of a selected portion of the acoustic casing signals detected at each of said receivers, said portion being selected based on the expected first energy arrival at the respective receiver;
    obtaining a ratio of the peak amplitudes associated with the firing of said first transmitter;
    obtaining a ratio of the peak amplitudes associated with the firing of said second transmitter;
    combining said ratios to produce a function representative of the attenuation of acoustic energy travelling through the casing; and
    recording said attenuation as a function of tool position in the borehole in which the attenuation a is determined by combining said ratios of peak amplitude in accordance with the following expression:

$$\frac{-10}{d2 - d1} \log_{10}\left[\frac{A_{12}A_{21}}{A_{11}A_{22}}\right] = a$$

where:
    d1 is the distance between a transmitter and a near receiver,
    d2 is the distance between a transmitter and a far receiver,
    $A_{11}$ is the peak amplitude of the casing signal from the first transmitter to the first receiver,
    $A_{12}$ is the peak amplitude of the casing signal from the first tramsmitter to the second receiver,
    $A_{21}$ is the peak amplitude of the casing signal from the second transmitter to the first receiver, and
    $A_{22}$ is the peak amplitude of the casing signal from the second transmitter to the second receiver.

2. The method of claim 1 in which said well tool includes a third acoustic receiver located between a first of said transmitters and an adjacent receiver comprising the steps of
    measuring the transit time of acoustic energy between said transmitters and at least one of said two receivers,
    comparing the measured transit time with a known value of transit time of acoustic energy through said casing,
    upon said measured transit time falling to a predetermined value less than the transit time through casing detecting the peak amplitude of the first halfcycle of acoustic energy appearing at said third receiver following excitation of said first transmitter, and
    recording said peak amplitude as a function of tool position in the borehole.

3. The method of claim 2 in which said predetermined value is 57 microseconds per foot.

4. The method of claim 2 in which a firing voltage is applied to excite said first transmitter,
    measuring the value of said firing voltage,
    comparing said measured value with a predetermined value of voltage to produce a modifying function, and
    applying said modifying function to the peak amplitude to correct for variation in the value of said firing voltage.

5. Apparatus for obtaining a measure of quality of a cement bond relative to a casing in a borehole comprising:
    a well tool having two longitudinally spaced acoustic transmitters and at least two longitudinally spaced acoustic receivers disposed between said acoustic transmitters with a transmitter receiver spacing to normally provide for a measurable signal-noise-ratio, for establishing the arrival of a casing signal prior to the arrival of a formation signal and to tolerate eccentring of as much as 0.3 inches;
    energizing means for repetitively energizing said acoustic transmitters to apply acoustic energy into the casing surrounding said well tool;
    recordings means for recording at least a portion of the acoustic energy signals detected at said receivers corresponding to energy from a first of said transmitters arriving at said receivers by way of said casing and energy arriving by way of said casing from a second of said transmitters following the firing of said first transmitter; and processing means for (a) measuring the peak amplitude of a selected portion of the acoustic casing signals detected at each of said receivers, for each of the forgoing generations and detections, said portion being selected based on the expected first energy arrival at the respective receiver;

(b) determining a ratio of the peak amplitudes associated with firing of said first transmitter;

(c) determining a ratio of the peak amplitudes associated with the firing of said second transmitter;

(d) combining said ratios to produce a function representative of the attenuation of acoustic energy travelling through the casing; and (e) determining said attenuation as a function of tool position in the borehole in which the attenuation a is determined by combining said ratios of peak amplitude in accordance with the following expression:

$$\frac{-10}{d2-d1} \log_{10}\left[\frac{A_{12}A_{21}}{A_{11}A_{22}}\right] = a$$

where:
d1 is the distance between a transmitter and a near receiver,
d2 is the distance between a transmitter and a far receiver,
$A_{11}$ is the peak amplitude of the casing signal from the first transmitter to the first receiver,
$A_{12}$ is the peak amplitude of the casing signal from the first transmitter to the second receiver,
$A_{21}$ is the peak amplitude of the casing signal from the second transmitter to the first receiver, and
$A_{22}$ is the peak amplitude of the casing signal from the second transmitter to the second receiver.

* * * * *